June 9, 1936.  J. MIHALYI  2,043,900
MULTIPLE IMAGE VIEW FINDER
Filed July 18, 1934  2 Sheets-Sheet 1
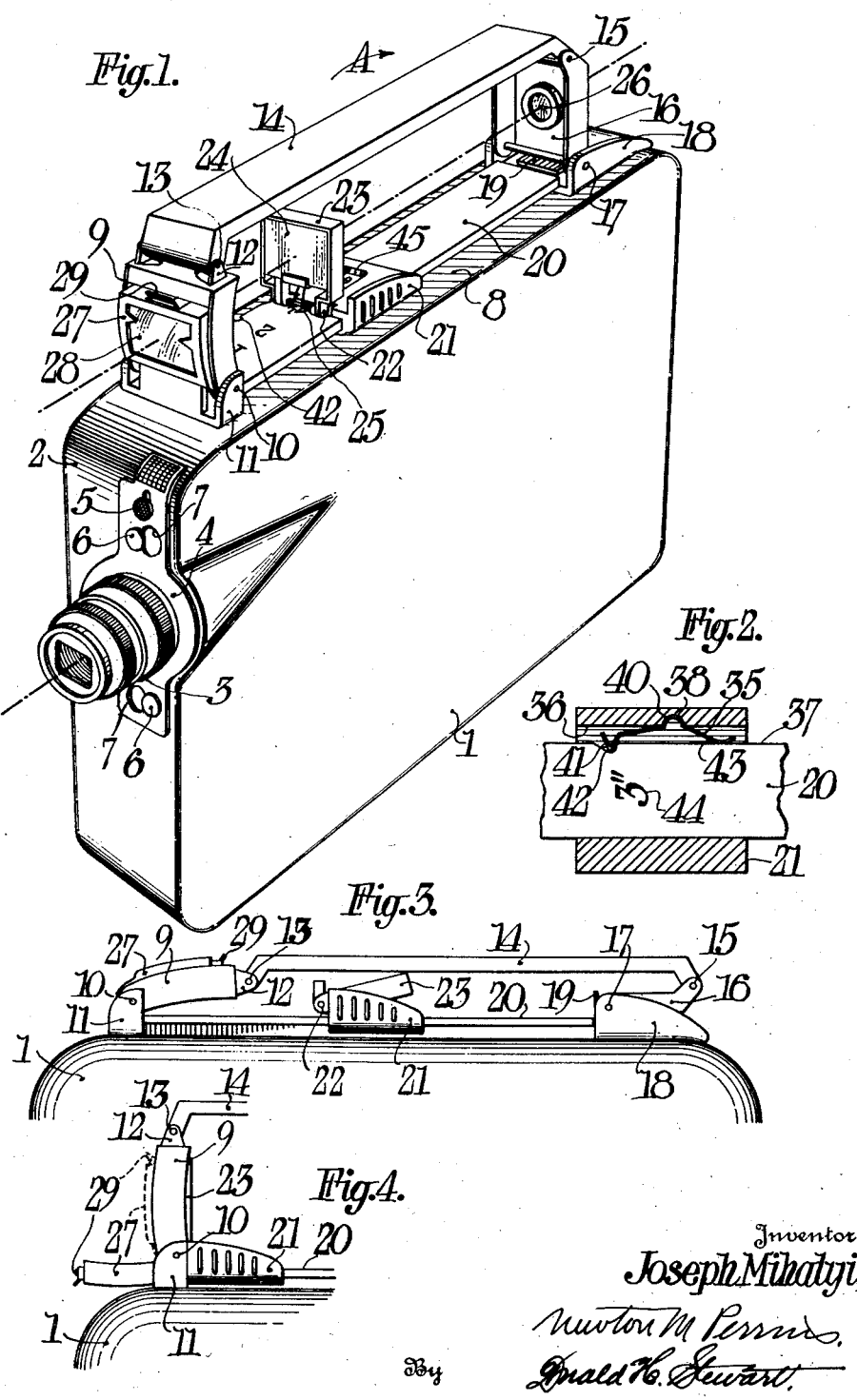
Inventor:
Joseph Mihalyi,
By Newton M Perris
Donald H. Stewart
Attorneys June 9, 1936.  J. MIHALYI  2,043,900
MULTIPLE IMAGE VIEW FINDER
Filed July 18, 1934  2 Sheets-Sheet 2
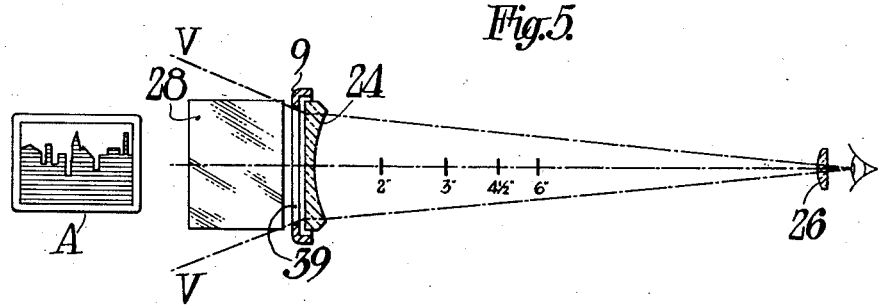
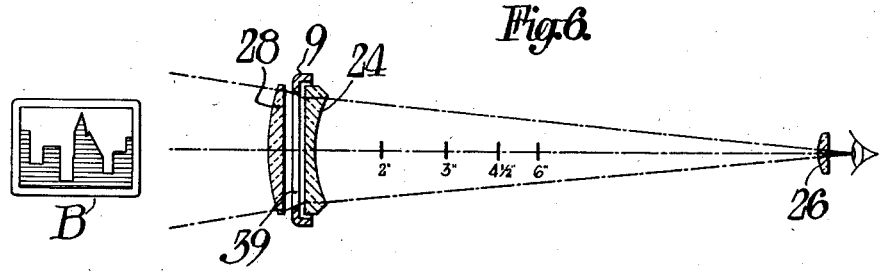
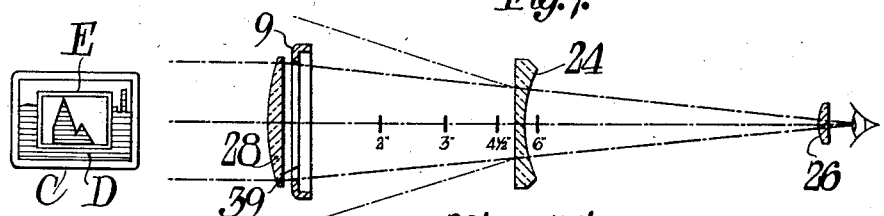
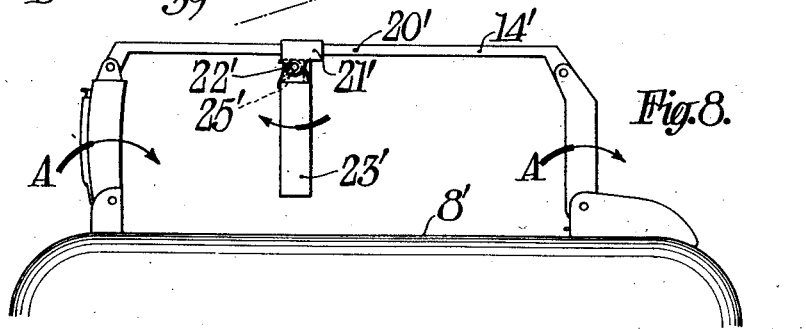
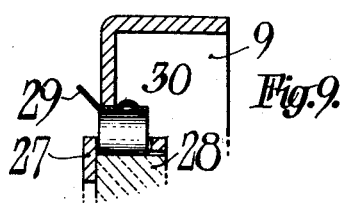
Inventor:
Joseph Mihalyi,
Newton M. Perkins,
Donald H. Stewart,
By
Attorneys.

Patented June 9, 1936

2,043,900

UNITED STATES PATENT OFFICE 2,043,900

MULTIPLE IMAGE VIEW FINDER

Joseph Mihalyi, Rochester, N. Y., assignor to Eastman Kodak Company, Rochester, N. Y., a corporation of New York Application July 18, 1934, Serial No. 735,749

4 Claims. (Cl. 88—1.5)

This invention relates to photography, and more particularly to view finders for photographic cameras.

One object of my invention is to provide a multiple image view finder which can be adjusted for producing the proper field of view for a series of objectives of different focal lengths. Another object of my invention is to provide a finder in which the field of view can be adjusted for objectives differing widely in focal length and one in which the elements of the finder are all permanently attached to the camera. Another object of my invention is to provide a view finder including a plurality of elements, all of which are mounted to fold flat upon the camera to take up a minimum amount of space and to provide a single means for simultaneously actuating all of the finder elements. Another object of my invention is to provide a finder in which a negative view finding lens is slidably mounted upon a track for adjustment to and from a view defining frame to vary the image in the finder for objectives of normal focal length and for objectives of longer than normal focal length. Still another object of my invention is to provide a finder with at least one element mounted to swing to and from an operative position so that the field of view can be adjusted for wide angle objectives, and other objects will appear from the following specification, the novel features being particularly pointed out at the end thereof.

In hand cameras it is frequently useful to be able to use objectives of different focal length for producing images of different size from the same point of view. This is useful both for cameras making single exposures and for motion picture cameras.

In motion picture cameras of the more recent compact type, it is comparatively difficult to provide a view finder which will take care of the widely varying focal lengths of the objectives commonly used on such view finders. In the amateur field there are a number of very small size cameras for taking pictures on film of a reduced size on which objectives varying from 15 mm. to 6 inches in focal length are commonly supplied.

Heretofore it has been necessary to supply with these different focal length objectives, supplementary masks which would reduce the size or image of the field of view shown in the finder to the proper proportions for the particular objective used. This was not an entirely satisfactory system because with objectives of long focal length the field of view would have to be masked down to very small proportions, and it was therefore difficult to pick up the object being photographed.

With a finder constructed in accordance with my invention, the field of view will at all times be kept as large as possible and at the same time the lenses forming the objective are so positioned and arranged that in the positions in which the elements will give the correct field of view for long focal length objectives, even though the field of view is reduced somewhat, the finder will show a larger area to supplement the picture area, making it easier to pick up an object being photographed. My view finder also is arranged to produce images of a field of view for long focal length objectives much larger than would be produced by the normal view finder masked down with a supplementary mask for the same focal length objective.

Coming now to the drawings wherein like reference characters denote like parts throughout:

Fig. 1 is a perspective view of a camera illustrating and constructed in accordance with a preferred embodiment of my invention.

Fig. 2 is a fragmentary detail section of a portion of the slidable mount for one of the view defining elements.

Fig. 3 is a fragmentary side elevation showing the finder elements in a partially folded position.

Fig. 4 is a fragmentary detail view showing one of the finder elements swung into an inoperative position with respect to the others.

Fig. 5 is a schematic view showing the finder elements adjusted for a wide angle camera objective.

Fig. 6 is a similar view but with the finder elements adjusted for objectives of normal focal length.

Fig. 7 is a similar view but with the finder elements adjusted for an objective of longer than the normal focal length.

Fig. 8 is a fragmentary side elevation showing a different method of mounting the slidable finder element.

Fig. 9 is a fragmentary detail section showing the latch for holding the front finder element in an operative or normal position.

It is obvious that a finder constructed in accordance with my invention is suitable for any type of photographic camera wherein objectives of different focal lengths are to be used. However, I have illustrated my invention as being applied to a small size motion picture camera because this is one of the most difficult cameras to equip with a multiple image finder.

Fig. 1 shows a well-known type of so-called "amateur size" motion picture camera which may be utilized for taking motion pictures upon small size film, such as the well known 16 mm. or 8 mm. film. The size of the film is, of course, entirely immaterial.

The camera may consist of a box or body portion 1 on the front wall 2 of which an objective, shown broadly as 3, may be positioned. This objective may be carried by a removable lens mount 4 of any well-known type and is here shown as being a removable mount of the type shown in Patent 1,736,436, Fuerst, November 19, 1929.

By removing the lens mount through releasing the latch 5 and turning the mount until the studs 6, which hold the mount in position, can pass through the aperture 7—all as is fully described in the above-mentioned patent—different focal length objectives can be placed on the camera. For cameras of this type it is customary to supply objectives of from 15 mm. to 6 inches in focal length. Any of these can be attached to the camera front 2.

On the top wall 8 of the camera, I provide a finder which consists of a plurality of view finding elements. In the showing of Fig. 1 these elements may consist of a frame 9 mounted on a hinge pintle 10 supported by a bracket 11 toward the front of the camera, this frame also carrying lugs 12 supporting a hinge pintle 13 which passes through the front end of a handle 14. This handle is pivoted at the rear end of the camera upon a pintle 15, this pintle being formed as a part of a frame 16 hinged at 17 to a bracket 18. A spring leaf 19 may be used to hold the frame in the erect position shown.

Between the front and rear finder elements, there is a track 20 upon which a slide 21 may freely move. Hinged to this slide at 22 is a frame 23 carrying a negative lens 24. A spring 25 encircling the hinge pintle normally holds the frame 23 in an erect position, but permits this frame to fold downwardly toward the camera when the handle 14 is turned in the direction of the arrow A to swing down the frames 9 and 16.

Frame 16 carries an eye-piece 26 which is a positive or viewing lens.

Frame 9 is supported by the hinge pintle 10, and this hinge pintle also supports a second frame 27 which carries a positive lens 28. Frame 27 is normally held in the position shown by means of a latch 29, shown in more detail in Fig. 9, this latch engaging a flanged edge 30 of the frame 9. By releasing the latch, the positive lens 28 in its frame can be swung forwardly into the position shown in Fig. 4 in which it is inoperative with respect to the other finder elements.

Referring particularly to Fig. 5, the finder elements are shown as being arranged for a wide angle objective; 15 mm. may, for instance, be considered a wide angle objective for the camera illustrated. In this case the positive lens 28 is swung downwardly out of its operative position with respect to the other lenses—that is, the negative lens 24 and the positive lens 26—so that the field of view will be defined by the opening 39 in the frame 9, the negative lens 24, and the positive lens 26. When adjusted for such wide angle objectives, the positive lens 28 must be swung to the position shown in Fig. 4. However, since the use of wide angle objectives is comparatively rare, this position of the front frame 9 does not often occur.

When the finder elements are adjusted for objectives of normal focal lengths, as is illustrated in Figure 6, the positive lens 28 is swung up in front of the opening 39 in the frame 9 and the negative lens 24 lies close to this frame on the opposite side thereof. In this position, which is the position for the objectives ordinarily used on the camera, the finder is compact and resembles an ordinary finder, that is, the finder elements are positioned toward each end of the handle 14, and from a side view of the camera the finder would resemble that shown in Patent 1,933,784, Wittel, November 7, 1933, which is a finder widely used on amateur cameras.

When it is desired to use objectives which are of greater than the normal focal length, the elements are adjusted to the position shown in Fig. 7. In this position, lens 24 has been slid rearwardly along its track 20 and is faced from both the positive lens 26 and the positive lens 28, this last-mentioned lens remaining, however, in the same position with respect to the opening 39 in the frame 9.

The images defined by the finder elements adjusted in Figs. 5, 6, and 7 are diagrammatically indicated by the frames A, B, and C.

It will be seen that the adjustment for the wide angle objective, indicated at Fig. 5, produces an image A of a wide angle. If a normal focal length objective is used and the finder is adjusted for it, a smaller portion of the field of view will show in the finder as disclosed at B. If the finder elements are adjusted for objectives of longer than normal focal length, as indicated in Fig. 7, a still smaller portion of the field of view will show, as indicated at C. However, when so adjusted there is a supplemental or additional image indicated in the finder at D so that an operator can more readily pick out the particular portion of the field that is being photographed, which is that portion which lies within the frame E.

A convenient construction for the negative lens 24 which will permit it to slide axially of the other finder elements is shown in the first three figures, in which the lens 24 is shown as being carried by a frame 23 hingedly mounted upon the slide 21 which can move over the track 20. I prefer to tension the slide 21, as indicated in Fig. 2, so as to hold it in a set position. This can be conveniently done by placing a spring 35 between one edge 36 of the slide and an edge 37 of the track 20, this spring preferably being provided with a rounded portion 38 for fitting into a notch 40 in the slide and being provided with one end 41 adapted to engage any one of a number of notches 42 which are spaced apart to indicate convenient focal distances. The opposite end of the spring 43, by resting on the edge 37 of the track, tends to hold the slide in the set position by friction.

On the top of the track 20 I provide a series of graduations 44 which may be in units of the focal lengths of the objectives used. These graduations, when viewed through a window 45 in the top of the slide, indicate to an operator the proper setting of the movable finder element for the different objectives used.

If desired, the track 20 may be omitted and, as shown in Fig. 8, the frame 23' may be made to slide upon a track 20' on a sliding member 21'. In this case the frame 23' is hinged to a pintle 22' and a spring 25' will hold the frame in the position shown. However, when the handle 14' is turned in the direction shown by the arrow A to fold the finder against the camera, as soon as the finder element 23' strikes the top 8' of the camera, it will be swung against the action of spring 25' in the direction shown by the arrow to permit this finder element to fold.

It should be particularly noted that with a finder constructed in accordance with my invention, the finder elements are calculated so that with objectives of normal focal length the slidable finder element 24 is positioned forwardly against the frame 9 so that the handle is accessible throughout its length for carrying the camera. It is only when objectives of longer than normal focal length are in use on the camera that the slidable element 24 is moved rearwardly from the frame 9 towards the positive lens or eyepiece 26. The usual long focal length objectives used on such cameras are ordinarily 2 or 3 inch objectives, so that even when used with long focal length objective the slidable element 24 is much closer to the front finder element than it is to the rear. This leaves the handle sufficiently free for its normal use, that of carrying the camera.

From the foregoing specification it is quite evident that the embodiment of my invention shown in the drawings and described is by way of illustration only and that it is entirely immaterial what focal length objectives are used, providing, of course, they come within the limits of adjustment of the finder elements. No detailed specifications have been given for the various lenses going into the construction of this finder because they will, of course, vary with the size of the image required, the length over all of the finder, and the variation required for the various focal length objectives to be used on the camera. The lens specifications can, however, readily be prepared by one skilled in the art for the particular purpose for which the variable view finder is to be designed.

Having now particularly described my invention, what I desire to secure by Letters Patent of the United States and what I claim is:

1. In a variable view finder for cameras, the combination with a pair of hingedly mounted, definitely spaced finder elements including a frame and an eye-piece, a handle pivotally connected to each finder element, a track extending between said finder elements, a slide movable over the track into a plurality of predetermined positions defined by a snap latch on the slide cooperating with notches in the track, a third finder element hingedly attached to the slide, a spring for holding the third finder element in an erect position thereon, said hingedly mounted element being adapted to be moved from its erect position when engaged by the handle connecting the first two mentioned finder elements.

2. In a variable view finder for cameras, the combination with a pair of hingedly mounted, definitely spaced finder elements including a frame and an eye-piece, a handle pivotally connected to each finder element, a track extending between said finder elements, a slide movable over the track into a plurality of predetermined positions defined by a snap latch on the slide cooperating with notches in the track, a third finder element hingedly attached to the slide, a spring for holding the third finder element in an erect position thereon, said third hingedly mounted finder element being adapted to be moved from its erect position when engaged by the handle connecting the first two mentioned finder elements, and a fourth finder element pivotally attached to the first mentioned finder element and adapted to move to and from a position close to the camera body and a latch for holding said finder element in an erect operative position.

3. In a variable view finder for cameras, the combination with a pair of hingedly mounted, definitely spaced finder elements including a frame and an eye-piece, a handle pivotally connected to each finder element, a track extending between said finder elements, a slide movable over the track into a plurality of predetermined positions defined by a snap latch on the slide cooperating with notches in the track, a third finder element hingedly attached to the slide, a spring for holding the third finder element in an erect position thereon, said third hingedly mounted finder element being adapted to be moved from its erect position when engaged by the handle connecting the first two mentioned finder elements, and a fourth finder element hingedly mounted with the first finder element and adapted to turn upon the hinge toward the camera body in either of two directions, and a latch for holding the element to the first mentioned finder element to turn upon the hinge with said first mentioned finder element to and from a folded position.

4. In a variable view finder for cameras, the combination with a pair of hingedly mounted, definitely spaced finder elements including a frame and an eye-piece, a handle pivotally connected to each finder element, a track extending between said finder elements, a slide movable over the track into a plurality of predetermined positions defined by a snap latch on the slide cooperating with notches in the track, a third finder element hingedly attached to the slide, a spring for holding the third finder element in an erect position thereon, said third hingedly mounted finder element being adapted to be moved from its erect position when engaged by the handle connecting the first two mentioned finder elements irrespective of the position of the third finder element slide on the track, said spring being adapted to erect said element to an operative position between the other two finder elements when said handle is used to erect said elements to an operative position.

JOSEPH MIHALYI.